United States Patent [19]

Graville et al.

[11] Patent Number: 4,620,082
[45] Date of Patent: Oct. 28, 1986

[54] PULSED ARC WELDING APPARATUS

[75] Inventors: Brian A. Graville, Georgetown; Edward Shmakov, Toronto, both of Canada

[73] Assignee: Welding Institute of Canada, Ontario, Canada

[21] Appl. No.: 676,228

[22] Filed: Nov. 30, 1984

Related U.S. Application Data

[63] Continuation of Ser. No. 419,032, Sep. 15, 1982, abandoned.

[30] Foreign Application Priority Data

Aug. 31, 1982 [CA] Canada .................................. 410482

[51] Int. Cl.⁴ ............................................... B23K 9/09
[52] U.S. Cl. ........................... 219/130.51; 219/130.31; 219/137 PS
[58] Field of Search ...................... 219/130.51, 130.31, 219/137 PS

[56] References Cited

U.S. PATENT DOCUMENTS

| | | | |
|---|---|---|---|
| 4,020,320 | 4/1977 | Pijls et al. ...................... | 219/137 PS |
| 4,087,671 | 5/1978 | Essers .............................. | 219/121 P |
| 4,162,379 | 7/1979 | Sebens et al. ...................... | 219/497 |
| 4,201,906 | 5/1980 | Puschner ........................ | 219/137 PS |
| 4,246,465 | 1/1981 | Ericsson ........................... | 219/130.51 |
| 4,247,751 | 1/1981 | Ashton et al. ................... | 219/130.31 |
| 4,282,569 | 8/1981 | Hardwick et al. .................... | 368/87 |
| 4,300,036 | 11/1981 | Johansson ....................... | 219/130.33 |
| 4,301,355 | 11/1981 | Kimbrough et al. ......... | 219/137 PS |
| 4,310,744 | 1/1982 | Okada ............................. | 219/130.31 |
| 4,319,124 | 3/1982 | Johansson ....................... | 219/130.51 |
| 4,320,282 | 3/1982 | McDonald et al. .......... | 219/137 PS |
| 4,322,602 | 3/1982 | Grist .............................. | 219/130.33 |
| 4,384,187 | 5/1983 | Jackson et al. ................ | 219/130.51 |
| 4,409,465 | 10/1983 | Yamamoto et al. ............ | 219/130.51 |

FOREIGN PATENT DOCUMENTS

| | | |
|---|---|---|
| 849684 | 8/1978 | Canada .................................. 327/70 |
| 901333 | 7/1962 | United Kingdom . |
| 1069511 | 5/1967 | United Kingdom . |
| 1069512 | 5/1967 | United Kingdom . |
| 1096401 | 12/1967 | United Kingdom . |
| 1106686 | 3/1968 | United Kingdom . |
| 1172322 | 11/1969 | United Kingdom . |
| 1173134 | 12/1969 | United Kingdom . |

Primary Examiner—Clifford C. Shaw
Attorney, Agent, or Firm—Murray and Whisenhunt

[57] ABSTRACT

A method of pulsed arc welding and an apparatus for carrying out the method, employ welding current pulses having an amplitude greater than the value of a background current. The arc voltage is sensed to provide a signal for controlling the frequency of the welding current pulses to counteract variations in electrode wire feed speed or spacing of the electrode from the workpiece.

10 Claims, 3 Drawing Figures

PULSED ARC WELDING APPARATUS

This application is a continuation of Ser. No. 419,032, filed Sept. 15, 1982, now abandoned.

FIELD OF THE INVENTION

The present invention relates generally to a method of pulsed arc welding and to apparatus for carrying out the method.

DESCRIPTION OF THE PRIOR ART

In metal arc welding with a uniform direct current, metal transfer can occur in the short circuiting, globular or spray modes.

Violent arc action and rapid puddle freezing are characteristic of short circuiting transfer.

Globular transfer is commonly used to reduce heat input, but since gravity provides the primary means of droplet detachment, the droplets fall downward and cannot be controlled. This prohibits out-of-position work and leads to irregular bead formation.

The spray transfer mode is the most preferable and for spray transfer a certain minimum welding current, commonly called the transition current, is required. In the spray mode of metal transfer, a welding current at or above a transition value produces a so-called pinch effect in a drop of molten material adhering to the tip of an electrode. Above the transition current value, the drop is detached by the pinch effect and the force of the arc propels the drop toward the work in whatever direction the electrode is pointed. Spray transfer is characterized by high droplet frequency and droplets of a diameter approximately equal to or less than the diameter of the electrode wire. In this condition the penetration and the bead formation are uniform and controllable. The spray mode performs well in many applications; however, it is burdened with the requirement of maintaining a sufficiently high electrode current density to sustain the arc temperature and magnetic forces necessary to pinch off and propel the droplets into the puddle. In order to selectively reduce and control the average arc power in the spray mode and at the same time to eliminate spatter, pulsed arc welding has been used.

For this purpose, there is employed a power source which generally provides two current levels, a steady "background" level, which is too low to produce spray transfer, and a "pulsed peak" current, which is superimposed upon the background current at a certain interval.

The pulse peak current is well above the transition current, and, usually, one drop is transferred during each pulse of the pulsed peak current. The combination of the two levels of current theoretically produces a steady arc and reduces spatter. However, in practice, the quality of pulsed arc welding greatly depends upon the skill of the welder or the stability of electrode wire feed speed. Thus, in the case of manual control, if the welder accidentally moves the welding gun too far towards the work or in the case of automatic electrode wire feed, if the wire speed increased, the process becomes unstable and finally may result in short circuiting. When the welder moves the gun too far away from the work or the wire speed is reduced, the process also becomes unstable and the arc may break.

In general, it can be said that in consumable electrode welding a constant arc length is obtained by matching the melting rate of the electrode to the feed rate of the electrode. To allow the arc length to 'self adjust' either the melting rate or the feed rate must change in response to changes in arc length. When using small wires for the electrode (e.g. in gas metal arc welding) the wire feed rate is usually too high to change rapidly and thus arc length control is achieved by allowing the current, and hence melting rate, to change. In pulsed welding systems the same method has usually been adopted and either the pulse peak current, pulse width or background current can be modulated to provide arc length control. Changes in pulse peak or pulse width can, however, change the mode of metal transfer, leading to more or less droplets per pulse or changing the droplet size.

In U.S. Pat. No. 4,301,355, issued Nov. 17, 1981 to Andrew G. Kimbrough et al, there is disclosed a method of and apparatus for gas metal arc welding in which power is passed from a constant current rapid response power supply to feed wire electrode and current and voltage feedback signals corresponding respectively to the value of the current and voltage of the welding arc are provided. The power from the power supply is then modulated by a current reference control signal at a given frequency and given amplitude to provide a current varying between a relatively high output current of the power supply and a relatively low output current. A pulse width modulator control signal corresponding to the amplified difference between the current feedback signal and a set-in current programmed signal is utilized to control the pulse width of the current reference control signal to provide essentially a constant current control mode of the power supply. In this mode, the rate of feed of the feed wire material corresponds to the amplitude difference between the voltage feedback signal and a set-in voltage programmed signal.

In a preferred embodiment of this prior invention, the method also includes the steps of providing an additional pulse width modulator control signal corresponding to the amplified difference between the voltage feedback signal and the voltage programmed signal. This additional pulse width modulator control signal can be selected at the operator's option to control the pulse width of the current reference control signal and thereby provide a constant voltage control mode of the power supply. When this additional pulse width modulator control signal is selected, the rate of feed of the feed wire material is maintained constant.

A further feature permits the selected modulator control signal to be pulsed at a low frequency relative to the given frequency between peak and base values to thereby alternately "melt" and "chill" the work. This low frequency is adjustable to provide for optimum root penetration and puddle control by this alternate "melting and "chilling" particularly in out-of-position welding. However, this prior patent makes no suggestion of varying the frequency of the pulses of the current reference control signal or the pulses of the welding current. Also, the mode in which the voltage feed back signal is employed to control the rate of feed of the feed wire material has the disadvantage that due to mechanical inertia of the wire feed mechanism, delays will occur in changes of wire feed speed and that accurate determination of the wire feed speed is difficult. In addition, this prior apparatus is relatively complicated and therefore expensive.

U.S. Pat. No. 4,247,752, issued Jan. 27, 1981 to Loren L. Stringer, discloses a constant current arc welder of the type in which arc current is regulated by thyristor phase angle adjustment, including voltage feedback voltage control and current feedback current control, with automatic transfer from the voltage control mode into the current control mode when current has been established in the arc. A time delay allows smooth transfer to the desired current operative level by limiting the current inrush under an initial current reference and with a chosen feedback control dynamic characteristic current boost is also automatically provided when the arc voltage falls below a predetermined level.

BRIEF SUMMARY OF THE INVENTION

According to the present invention, the welding arc is stabilized by detecting the arc voltage to provide a pulse control signal which is utilized to control the frequency of a pulsed welding current.

The present invention enables control of the welding arc length, by controlling the average melting rate of the electrode, to be achieved without modulation of the pulse peak or width of the pulsed welding current or the amplitude of the background current and therefore does not influence the metal transfer. Modulating the frequency of the welding current pulses varies the frequency of droplet transfer but not the mode of droplet transfer.

The pulse control signal is preferably obtained entirely independently of any detection or measurement of any operating parameter of the welding process other than the welding arc voltage. Consequently, changes for example in the electrode wire diameter and, when the wire is automatically fed towards the workpiece, the rate of feed of the electrode wire do not require any modification of the control system employed for controlling the welding current and, in particular, the pulses of the welding current.

The electrode wire can therefore be fed independently of the present control system used for regulating the arc welding current to stabilize the arc.

In a preferred embodiment of the invention, the detection of the arc voltage is used to provide an arc voltage signal which is compared with a reference voltage signal to provide a difference signal, which is then processed to provide the pulse control signal, and the reference voltage signal can be adjusted to correspondingly vary the stable arc length of the welding arc.

The arc voltage signal is obtained by selectively integrating the arc voltage or employing a sample-and-hold circuit to sample the arc voltage during the pulses of the welding current or to sample the background voltage of the pulsed arc voltage during the intervals between the pulses of the welding current.

BRIEF DESCRIPTION OF THE DRAWINGS

Further features, advantages and objects of the invention will be more readily understood from the following description thereof given, with reference to the accompanying schematic drawings, in which.

DESCRIPTION OF THE PREFERRED EMBODIMENTS

Figures 1, 2:
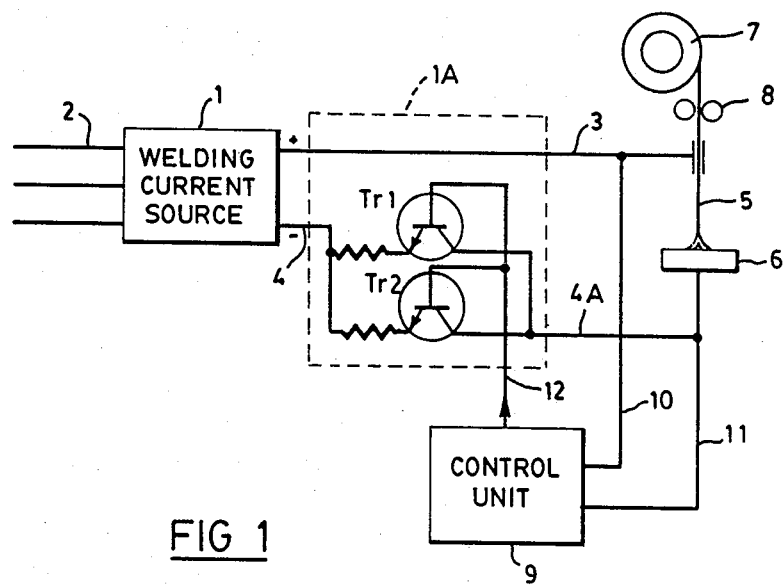
FIG. 1 is a block diagram of a system according to the invention for gas metal arc welding (GMAW) which comprises a control unit for supplying a pulse control signal to a transistorized power regulator for controlling a welding current source to provide a pulsed welding current.
FIG. 2 is a block diagram of a system according to the invention for welding with a shiedded metal arc electrode employing the same feedback control unit as FIG. 1 the welding current from the welding current souce.

In FIG. 1 there is illustrated the preferred embodiment of the invention, which comprises a controllable welding current source 1, which is supplied through three-phase mains current supply conductors 2 and which is a commercially available conventional power source and regulator power provides a constant voltage welding current to a transistorized power regulator 1A for providing a pulsed welding current comprising an unmodulated background current having an amplitude which is insufficient to effect spray transfer and a pulse current having pulses of predetermined duration and amplitude, the amplitude of the pulses when superimposed on the background current being sufficient to effect spray transfer. The welding current source 1 has two output conductors 3, 4 which are connected through, regulator 1A to a consumable wire electrode 5 and to a workpiece 6, respectively, for creating a welding arc between the electrode 5 and the workpiece. The wire electrode 5 is fed to a weld location from a storage reel 7 by means of a pair of feed rollers 8 driven by an electric motor (not shown). The speed of rotation of the feed rollers 8 and consequently the speed at which the wire is fed can be manually pre-set and adjusted according to the welding parameters.

Reference numeral 9 identifies a control unit connected by conductors 10 and 11 to the electrode 5 and the workpiece 6 for detecting the arc voltage of the welding arc between the electrode 5 and the workpiece 6. A pulse control signal from the control unit 9 and corresponding to the welding arc voltage is supplied through a conductor 12 to a transistorized power regulator 1A for controlling the output of the the welding current source 1. More particularly, the conductor 12 is connected to respective bases of two power transistors, indicated by references $Tr_1$ and $Tr_2$, which are connected in parallel with one another, the parallel combination being connected in series with the welding current source 1, through conductor 4, and the workpiece 6 through conductor 4A.

FIG. 2 illustrates a variation of the preferred embodiment of the invention.

As shown in FIG. 2, the controllable welding current source 1 is again supplied through the three-phase mains current supply conductors 2 and in this case has its two outputs 3 and 4 connected to a shielded metal arc electrode 14 and to the workpiece 6, respectively. The distance between the tip of the electrode 14 and the workpiece 6 depends upon the welding parameters and the skill of the welder and is manually adjusted by the welder during the welding operation. A signal corresponding to the welding arc voltage is constantly supplied through conductors 10 and 11 to the control unit 9, from which the pulse control signal is again supplied through the conductor 12 to a thyristor power regulator 1B, which comprises a pair of thyristors $T_1$ and $T_2$ connected in parallel with one another between the conductor 3 and the electrode 14, the control unit 9 being connected to the thyristors $TH_1$ and $TH_2$ through firing circuitry 15.

Figure 3:
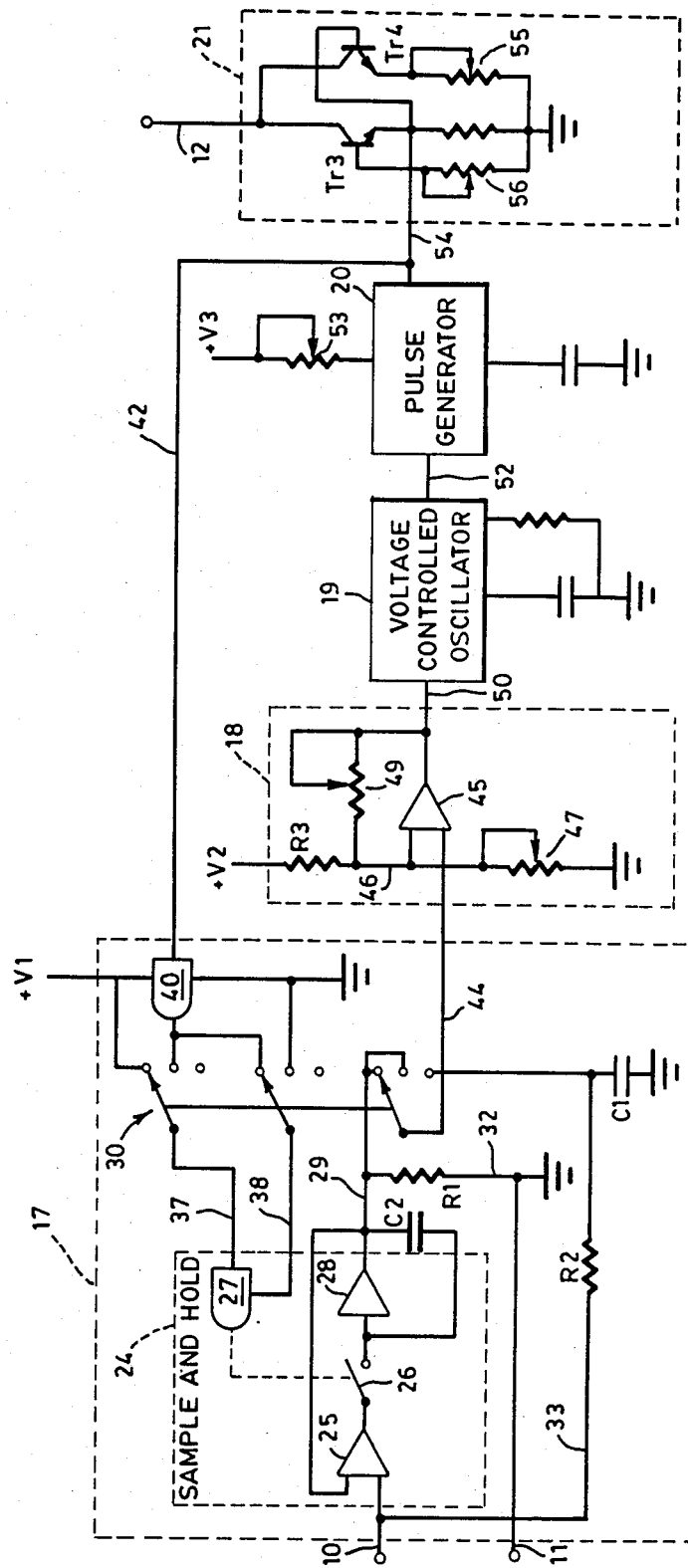
FIG. 3 is a block diagram of the control unit incorporated in the welding systems of FIGS. 1 and 2.

The control unit 9 of FIGS. 1 and 2 is illustrated in greater detail in FIG. 3 and comprises an arc voltage measurement unit 17, a voltage convertor 18, a voltage controlled oscillator 19, a pulse generator 20 and an amplifier 21. The arc voltage measurement unit 17 includes a sample-and-hold circuit 24, which has a differential amplifier 25, the conductor 10 being connected to the input of differential amplifier 25 and the output of the latter being connected through a switch 26, controlled by an AND gate 27, to a buffer amplifier 28, the output of which is connected by a conductor 29 to two terminals of a three-way switch indicated generally by reference numeral 30. The output is also connected by conductor 29 to the other input of differential amplifier 25. The conductor 11 is connected to a conductor 32 between ground and a resistor R1 and through the resistor R1 to the conductor 29.

The conductor 10 is also connected through a conductor 33 and an integrating circuit, comprising a resistor R2 and a grounded capacitor C1, to a respective contact of the switch 30.

A storage capacitor C2 is connected across the buffer amplifier 28. The AND gate 27 has its input terminals connected through respective conductors 37 and 38 to respective movable contacts of the switch 30.

The arc voltage measurement unit 17 also includes an AND gate 40 having one input connected to a voltage source $+V_1$, which is also connected to a respective terminal of the switch 30, another input connected to a feedback conductor 42, another input connected to ground and to a respective contact of the switch 30. The output of the AND GATE 40 is connected to a respective terminal of the switch 30.

A third movable contact of the switch 30 is connected by a conductor 44 to one input of the differential amplifier 45 in the voltage convertor 18, the other input of which is connected to conductor 46, between a potentiometer 47, which is grounded, and a resistor R3 connected to a voltage source $+V_2$ The output of the differential amplifier is connected through a potentiometer 49 to the conductor 46 and, by a conductor 50, to the voltage controlled oscillator 19.

The output of the voltage controlled oscillator 19 is connected by a conductor 52 to the pulse generator 20, which is provided with a potentiometer 53 connected to a voltage source $+V_3$ and the output of which is connected by a conductor 54 to the amplifier 21, and connected by conductor 42 to an input of the AND GATE 40.

The amplifier 21 has a pair of transistors $Tr_3$ and $Tr_4$ connected to respective potentiometers 55 and 56 and the outputs of the amplifier 21, and hence of the control unit 9, are provided by connecting the outputs of the transistor collectors to conductor 12.

The operation of the above-described apparatus is as follows:

The arc voltage of the welding arc between the electrode 5 and the workpiece 6 is applied by the conductors 10 and 11 to the arc voltage measurement unit 17, which is preset to any one of three possible operational modes by adjustment of the switch 30.

With the switch 30 in a first switch position (1) as illustrated in FIG. 3, the arc voltage measurement unit 17 is preset to measure the arc voltage during the pulses of the pulsed welding current. In this mode, when a pulse is generated by the pulse generator 20, it is applied through the feedback conductor 42, the switch 30 and the conductor 38 to one input of the AND gate 27, the other input of which receives a voltage from the voltage source $+V_1$ through the switch 30 and the conductor 27. The AND gate 27 accordingly closes the switch 26 so that the output signal of the differential amplifier is applied through the switch 26, the buffer amplifier 28, the conductor 29, the switch 30 and the conductor 44 to one input of the differential amplifier 45 in the voltage converter 18.

The arc voltage measurement unit 17 thus provides on the conductor 44 an arc voltage signal corresponding to the arc pulse voltage.

When the switch 30 is preset to a second switch position (2) to connect the output of the AND gate 40 to the conductor 37, the switch 26 is closed in the intervals between the pulses of the arc voltage to provide the arc voltage signal on the conductor 44 as a signal proportional to the arc background voltage.

When the switch 30 is preset to its third switch position (3), the sample-and-hold circuit 24 is bypassed and the integrating circuit formed by the resistor R2 and the capacitor C1, is connected to the conductor 44 to provide the arc voltage signal as a signal proportional to an average of the arc pulse voltage measured between conductors 10 and 11 and the arc background voltage.

The potentiometer 47 is adjusted to control the magnitude of a reference voltage signal applied to the other input of the differential amplifier 45, the output voltage signal of which is therefore a difference signal proportional to the difference between the arc voltage signal and the reference signal. By adjusting the reference signal, the stable length of the welding arc can be varied. By adjusting the potentiometer 49, the proportionality and linearity of the output signal relative to the arc voltage signal can be varied.

The oscillator output signal, the frequency of which is a function of the arc voltage, is applied through the conductor 52 to the pulse generator 20, which produces an output pulse signal having pulses of a predetermined duration and a frequency corresponding to that of the oscillator output signal. The duration of these pulses can be adjusted by means of the potentiometer 53, which is normally pre-set according to the welding parameters.

The output pulse signal is supplied through the conductor 54 to the amplifier 21, where the pulse amplitude may be adjusted by the potentiometer 55 and the amplitude of the background current by the potentiometer 56, to provide an amplified pulse control signal, through conductor 12 to regulator 1A, which will then regulate the pulsed welding arc current with current pulses having a pulse frequency controlled by the welding arc voltage.

We claim:

1. A pulsed arc welding system, comprising:
   a welding electrode;
   a single power source for supplying a welding current to said welding electrode to create a welding arc between said welding electrode and a workpiece in response to a control signal;
   welding current regulator means comprising at least one transistor having its emitter connected to said single power source and its collector connected to said workpiece for providing a continuous background current component, said transistor also providing a pulse current component superimposed on said continuous background current component to said welding electrode;

means for detecting the magnitude of the arc voltage of the welding arc and providing an arc voltage signal;

means for processing said arc voltage signal independently of any other detection of the operating parameters of said pulse arc welding system to provide a pulse control signal;

conductor means for feeding said pulse control signal to said at least one transistor whereby the frequency of said pulse control signal is proportional to the magnitude of the arc voltage, said pulse control signal being connected to the base of said at least one transistor to control said welding current applied to said welding electrode.

2. A pulsed arc welding system as claimed in claim 1, wherein said processing means includes means for providing a reference signal, means for comparing said reference signal with said arc voltage signal to provide a difference signal and means for varying said reference signal to thereby vary the stable length of said welding arc.

3. A pulsed arc welding system as claimed in claim 2, wherein said processing means includes means for varying the relationship between said difference signal and the difference between said reference signal and said arc voltage signal.

4. A pulsed arc welding system as claimed in claim 1, wherein said processing means includes means for adjusting the relationship of the said pulse control signal to said arc voltage.

5. A pulsed arc welding system as claimed in claim 1, where said processing means comprises integrator circuit means for providing an average of said arc voltage.

6. A pulsed arc welding system as claimed in claim 1, including a means by which said arc voltage is integrated to produce said arc voltage signal.

7. A pulsed arc welding system as claimed in claim 1, wherein said processing means comprises sample-and-hold circuit means for sampling said arc voltage.

8. A pulsed arc welding system as claimed in claim 7, wherein said sample-and-hold circuit means includes adjustable means for selectively sampling said arc voltage during and between said pulses of said pulsed current.

9. A pulsed arc welding system as claimed in claim 1, wherein said detecting means includes a first means for integrating said arc voltage to provide said arc voltage signal; a second means responsive to said arc voltage during the pulses of said pulsed current for providing said arc voltage signal and a third means responsive to said arc voltage during the intervals between said pulses of said pulsed current for providing said arc voltage signal and a means for selectively operating any one of said first, second and third means.

10. A pulsed arc welding system as claimed in claim 9, wherein said second and third means are incorporated in a sample-and-hold circuit.

* * * * *